C. H. BURRITT.
COMBINATION WELDING AND CUTTING TORCH.
APPLICATION FILED OCT. 25, 1918.
1,316,681.
Patented Sept. 23, 1919.
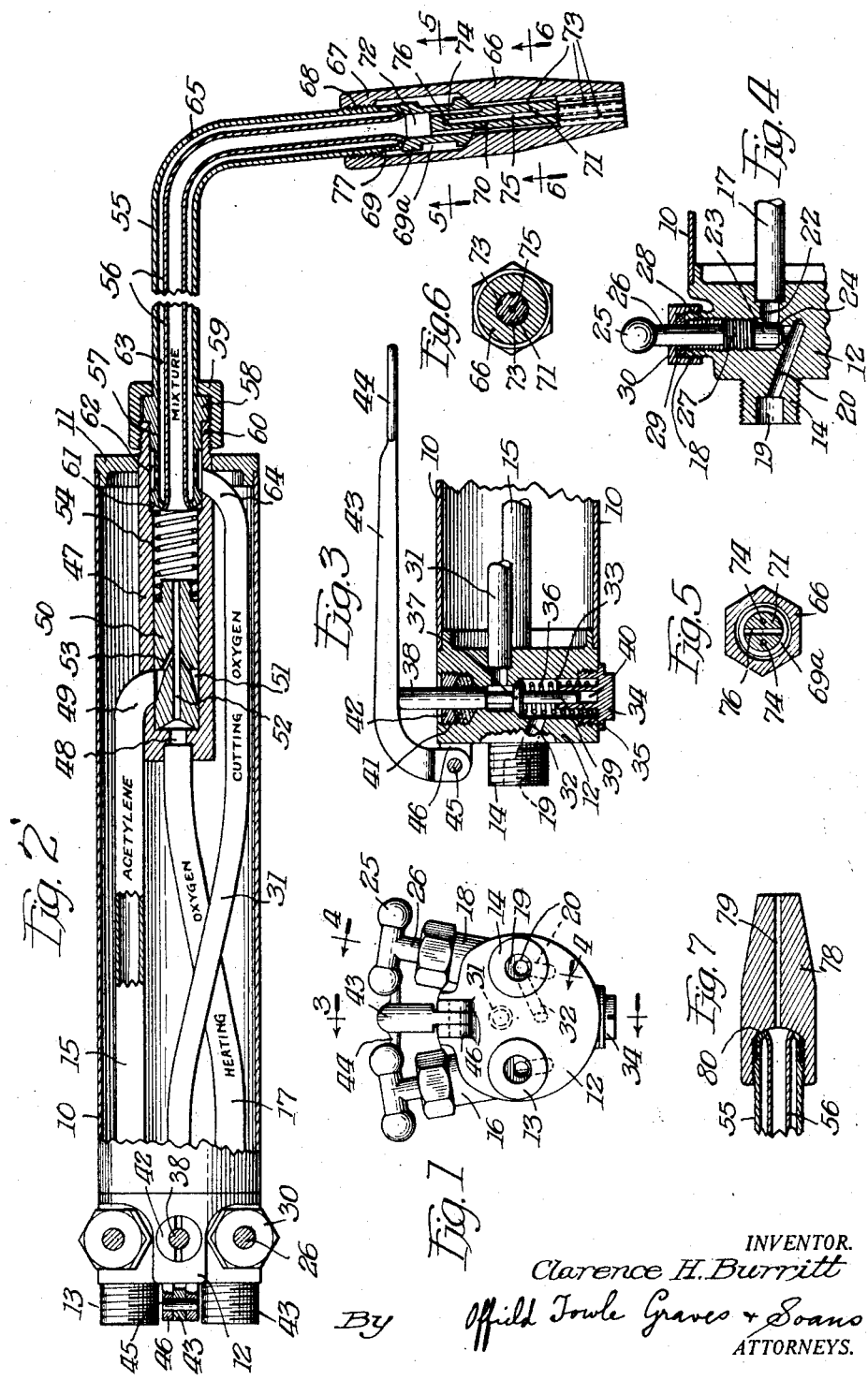
INVENTOR.
Clarence H. Burritt
By Offield Towle Graves + Soans
ATTORNEYS.

UNITED STATES PATENT OFFICE.

CLARENCE H. BURRITT, OF SAN FRANCISCO, CALIFORNIA.

COMBINATION WELDING AND CUTTING TORCH.

1,316,681.   Specification of Letters Patent.   Patented Sept. 23, 1919.

Application filed October 25, 1918. Serial No. 259,606.

*To all whom it may concern:*

Be it known that I, CLARENCE H. BURRITT, a citizen of the United States, residing at San Francisco, in the county of San Francisco and State of California, have invented certain new and useful Improvements in Combination Welding and Cutting Torches, of which the following is a specification.

My invention relates to improvements in combination welding and cutting torches, and has particular reference to torches in which oxygen gas is employed in connection with a gaseous fuel, such as acetylene.

Torches of the oxygen-acetylene type are usually employed for two general classes of work, viz., for heating or welding purposes in which a neutral or non-oxidizing jet or flame is provided, and for cutting metals where a strongly oxidizing jet or flame must be used in order to burn up the metal in the zone of cutting.

The object of my invention is to provide an improved arrangement of the class described, which shall be extremely efficient when used in cutting, and shall also be efficient when used for simply heating or welding; to provide a construction having certain main elements which may be combined optionally with other minor elements, one for welding and the other for cutting, obviating the necessity of providing complete outfits throughout for both purposes; to provide an improved construction in which the different attachments are of a comparatively simple character and may be applied, detached, or changed, quickly, simply, and conveniently; to provide an improved torch in which the change from a welding to a cutting outfit, or vice versa, is effected by simply changing the nozzle through which the flame is directed to the work; and in general, to provide an improved combination torch of the character referred to.

In the drawings, illustrating a preferred embodiment of my invention—

Figure 1 is an end elevation of the torch;

Fig. 2 is a longitudinal section taken through the barrel, mixer tube, and nozzle, as arranged for cutting;

Fig. 3 is a section taken on the line 3—3 of Fig. 1;

Fig. 4 is a section taken on the line 4—4 of Fig. 1;

Fig. 5 is a section taken on the line 5—5 of Fig. 2;

Fig. 6 is a section taken on the line 6—6 of Fig. 2; and

Fig. 7 is a longitudinal section through the nozzle used for welding or heating only.

Referring to the drawings, 10 represents a cylindrical barrel element constructed from a section of suitable metallic tubing, the forward end of said barrel 10 being fitted with a front head 11, while the rear end is closed by a valve-housing 12. The valve-housing 12 is formed with a pair of threaded nipples 13 and 14, to which may be connected, respectively, the flexible hose leading to the acetylene and oxygen-supply tanks.

The gaseous fuel, that is to say, in the present instance, acetylene is conducted to the carbureter or mixing valve through a gas-supply pipe 15 which communicates with the nipple 13 through a valve located in a housing 16. Oxygen is also conducted to the mixing valve through a pipe 17 which communicates with the nipple 14 through a similar valve located in the housing 18. Each of the valves contained in the housings 16 and 18 is of the type illustrated in Fig. 4, in which figure 19 is a small recess bored in the outer end of the nipple 14, and 20 is an inclined conduit drilled into the body of the valve housing 12 from the bottom of the recess 19 and beyond the bottom of a small valve cavity 21. Said valve cavity 21 communicates with the oxygen-supply pipe 17 through a small longitudinal conduit 22. The vertically adjustable valve proper 23, in conjunction with the conical valve-seat 24 in the housing 14, enables the supply of oxygen to be properly controlled.

Means for adjusting the valve proper 23 comprises a small handle member 25 on the extremity of the outwardly-projecting stem portion 26 of the valve, the lower part of said stem 26 being threaded, as shown at 27, to fit a similarly threaded aperture 28 in the housing. In order to prevent escape of fluid, a gland-packing 29 around the valve stem 26 is employed in connection with a suitable adjusting nut 30 threaded onto the outer end of the valve stem housing 18. It will be understood that the acetylene-supply valve and its housing 16 are substantially identical in construction and function with the oxygen valve arrangement just described, and therefore need not be further illustrated or referred to.

Oxygen for cutting purposes is supplied through a third pipe 31, it being understood that all of said pipes 15, 17, and 31 are inclosed within the barrel 10 of the device. The pipe 31 receives oxygen through a valve arrangement, shown best in Fig. 3, in which 32 is a drilled passageway leading from the bottom of the recess 19 into a transversely-extending valve chamber 33, the outer end of said valve chamber being closed by a screw cap 34. The inner end 35 of said screw cap 34 is reduced in diameter so as to fit loosely within a coil compression spring 36 by which the valve 37 automatically seats itself. The lower end of the valve stem 38 is considerably reduced in diameter, as shown at 39, in order to fit an axially extending hole 40 drilled into the inner extension 35 of the screw cap 34, thereby supporting said valve 37 without undue side shake. It will be manifest that the valve 37 is of the upward sealing type and is effective to control the flow of oxygen from the cavity 33 into the rear end of the oxygen pipe 31. In order to prevent loss of oxygen, the stem 38 is furnished with a suitable stuffing box which includes packing 41 and an adjustable plug 42 which acts as a gland through which the valve stem 38 passes.

Vertical movement of the valve 37, which under ordinary conditions is not used except when supplying oxygen for cutting purposes, is effected by means of a thumb-lever 43, the outer end of which has a flattened finger-plate 44, while the rear end is pivoted on a pin 45 carried in a pair of small twin lugs 46 formed as parts of the valve housing 12. It will be manifest that pressure upon the finger-plate 44 will cause a depression of the valve 37, permitting oxygen to flow into the supply pipe 31, a reverse or closing movement of said valve being effected by the compression spring 36, in addition to the tendency of the valve to move upwardly, due to pressure fluid within the valve chamber 33.

Describing the mixture valve element, it will be noted, upon inspection of Fig. 2, that the forward head of cap 11 is fitted with a longitudinally-extending chamber 47, the major portion of which extends into and is inclosed within the barrel 10. The rear end of said tubular member 47 is drilled out, as shown at 48, in order to communicate with the end of the oxygen-supply pipe 17, which is screwed, or otherwise connected, into the end of said tubular member 47.

The acetylene-supply pipe communicates with the interior of the chamber 47 through a transverse aperture, the outer end 49 of said tube 15 being bent at an angle, to facilitate such connection. Seated in the inner end of the mixer chamber 47 is a mixer plug 50, the inner end of which fits the bore of the chamber 47. At the point where the end 49 of the acetylene pipe 15 enters the side of the chamber 47, the mixer plug 50 is turned off, as shown at 51, so as to leave an annular recess extending around the said plug 50. Said annular recess communicates with the central bore 52 of the mixer plug through a plurality of inclined, outwardly directed passage-ways 53 drilled obliquely in the body of said mixer plug 50. The mixer plug 50 is seated in the inner end of the chamber 47 by virtue of a small coil compression spring 54 interposed between the outer end of the mixer plug 50 and the inner end of the conveyer tube 55.

Said conveyer tube 55 extends into the outer end of the bore of the mixer chamber 47 and contains an inner mixture pipe or conduit 56, the inner end of said mixture tube 56 being suitably fitted to the inner end of the conveyer tube 55, thereby providing a sealed annular space around the mixture tube and within the said conveyer tube 55. The inner end of the conveyer tube 55 is enlarged, as shown at 57, in order to fit within the bore of the mixer chamber 47, and has a flange 58 capable of being forced into tight-fitting engagement with the outer end of the mixer chamber 47 by means of a suitable lock-nut 59 threaded onto the outwardly projecting end 60 of the mixer chamber 47. The inner extremity of the nozzle tip is a good fit in the counter-bore portion 61 of the mixer tube. In view of the above construction, it will be manifest that the heating mixture is confined in its path to the interior of the mixture pipe 56.

By referring again to Fig. 2, it will be observed that the enlarged portion 57 of the inner end of the nozzle tip is reduced in diameter somewhat, as shown at 62, in order to provide an annular cavity or opening through which oxygen for cutting may be admitted to the annular conduit 63 within the conveyer tube 55. Such oxygen for cutting purposes is conducted into the annular opening 62 through a suitably located transverse opening in the wall of the mixer chamber 47, the end 64 of the oxygen pipe 31 being suitably bent to enter and be secured in said transverse opening.

Ordinarily the conveyer tube 55 is of suitable length and is frequently bent down at an angle, as shown at 65 in Fig. 2, for convenience in manipulating the jet, the barrel 10 constituting the handle of the device. The outer turned-down end of the conveyer tube 55 is also equipped with what may be termed a nozzle 66 through which the jet is projected onto the work. In the present instance, such nozzle 66 comprises an upper extension 67, the upper end of which is threaded, as shown at 68, to screw onto a correspondingly threaded portion of the conveyer tube 55. The extreme outer end of the conveyer tube 55 is finished off in substantially the same manner as the inner end of the conveyer tube; that is to say, the tubes 56 and 55 are brought together so as to prevent direct escape of heating oxygen from the cavity 63 out of the end of the tube. The upper extension 67 of the nozzle 66 is counter-bored in order to provide a suitable recess 69ª to contain the upper end 69 of the nozzle plug 70, said nozzle plug being insertible from the upper end of the nozzle and having a reduced stem portion 71 fitting within a longitudinal opening drilled axially in the lower or tapered portion of the nozzle 66. The lower end of the enlargement 69 of the nozzle plug has tight-fitting engagement with the bottom of the recess 69ª, and the upper end of the said nozzle plug 69 has tight-fitting engagement with the end of the conveyer tube 55 so that there will be no possibility of leakage from the recess 69ª into the opening 72 of the nozzle plug alined with the mixture pipe 56 and freely communicating therewith.

The mixture or heating jet is projected outwardly from the nozzle 66 through a series of small grooves or channel-ways 73 (see also Fig. 5) cut in the stem part 71 and communicating with the mixture cavity 72 through a suitable number of drilled openings 74. Oxygen for cutting purposes is delivered through the central bore 75 of the nozzle plug, said central bore 75 communicating with the oxygen cavity 69ª by a hole 76 drilled diametrically through the part 69, oxygen entering the cavity 69ª from the pipe 55 by means of transverse openings 77 in the wall of the pipe 56.

I will now trace the paths of the acetylene and the oxygen. Starting from the nozzle 13 and passing through the valve arrangement 16 into the pipe 15, the acetylene enters the annular recess 51 and is conducted into the converging conduits 53 where it joins the heating oxygen which has been conducted into the central bore 52 of the mixer plug, having passed through valve housing 18, oxygen pipe 17, and opening 48. When the acetylene enters the tube 52, it is immediately carried along with the moving current of oxygen and a combustible mixture is formed. In this connection, it will be observed that the mixing together of the acetylene and oxygen before it enters the mixture conveyer tube 56, is rendered more perfect and complete by reason of the spring element 54 in the mixing chamber, the turns of said spring serving to effectively break up and intimately mix together the two gases forming the combustible mixture.

The combustible mixture passes through the inner conveyer tube 56 and enters the small cavity 72, from which it passes by the small opening 74 into the openings 73 which conduct it out of the tip of the nozzle.

The cutting oxygen enters the valve chamber 33 through the inclined by-pass 32, and when the hand-lever 43 is depressed, said gas passes by the valve 37 into the pipe 31 and opening 62 into the outer conveyer tube 55. From the outer end of said tube 55, said cutting oxygen passes through the transverse opening 77 into the space 69ª and through the diametric hole 76 into the central bore 75. The cutting oxygen, by reason of its passing out centrally of the nozzle and within the hollow jet of flame formed by the streams of flame issuing from the openings 73, is extremely efficient in oxidizing and removing the metal heated to oxidizing temperature by the flame of the torch.

The mechanical design of the arrangement is of an extremely compact character, all three valves being arranged in a group at the rear end of the shell or barrel 10, which serves as a handle for the device. The conveyer tube connection and securing means are such that the said tube may be turned to any convenient operating angle, while at the same time maintaining the valve group in the most convenient position for controlling the mixture and oxygen supplies.

It will be observed that the channels 53 are inclined at an angle of approximately thirty degrees (30°) to the axis of the mixer plug 50, thereby causing the central jet of oxygen to exert a powerful suction effect upon the acetylene, and thus maintaining a substantially uniform supply of acetylene, regardless of variations in the supply pressure.

In Fig. 7 I have illustrated a design of tip which may be employed in place of the nozzle 66, if at any time it is desired to use the torch for welding purposes and not for cutting. Said welding tip 78 has a simple central orifice 79 which communicates directly with the open end of the mixture or conveyer tube 56, and, by reason of the gas-tight joint 80, which is established when the tip 78 is screwed tightly over the end of the outer conveyer tube 55, leakage is entirely prevented. When operating with the welding tip 78, the cutting oxygen line is out of commission and the lever 43 may be thrown back to an angle of approximately one hundred and eighty degrees (180°) so as to be out of the way when doing the welding.

The above detailed description of the mechanical construction of the device is not intended to be any limitation of the scope of the invention, which should be determined by reference to the appended claims.

I claim—

1. A torch of the class described which includes a casing, three valves at one end of the casing for controlling separate supplies of two gases capable of combining with the production of heat, a mixer, pipes leading from two of said valves to the mixer, and both inclosed in the casing, another pipe leading from the other valve and extending beyond the mixer also inclosed in said casing, a double passage conveyer tube rotatable in the casing end opposite the valves, one passage leading from the mixer and the other from the pipe beyond the mixer.

2. In a torch of the class described, a tubular casing, three valves at one end of the casing for controlling separate supplies of two gases capable of combining for the production of heat, means forming a mixer at the other end of the chamber, pipes leading from the valves to the mixing chamber, and a conveyer tube leading from the chamber, and adjustably rotatable in the other end of the casing.

3. In a torch of the class described, a tubular casing, three valves at one end of the casing for controlling separate supplies of two gases capable of combining for the production of heat, means forming a mixing chamber at the other end of the casing, pipes leading from two of said valves to the mixer and inclosed in the casing, a double passage conveyer tube, one passage of which is connected to the mixing chamber, and a third pipe leading from the other valve and connected to the said other passage of the conveyer tube beyond the mixer, and also inclosed in said casing.

4. In a torch of the class described, a tubular casing with a three valve housing at one end, means forming a mixing chamber at the other end of the casing, pipes leading from two of the valves to the chamber, a conveyer tube rotatable in the chamber and having two passages, one of which leads directly from the chamber, and a separate tubular member leading from the other valve to the other passage of the tube and discharging at the end of the tube.

5. In a torch of the class described, a tubular casing with a three valve housing at one end and means forming a mixing chamber at the other end, pipes leading directly from two of said valves to the inner end of the chamber, and a third pipe leading from the remaining valve to the outer end of the chamber, and a double passage conveyer tube inserted in the mixing chamber having a central passage connected with the chamber and terminating in a plurality of apertures arranged in a circle, and a concentric outer passage which is connected with the pipe at the outer end of said chamber and terminates in a single outlet at the center of the circle.

6. In a torch of the class described, the combination with a means forming a mixing chamber and means for supplying a combustible mixture at one end thereof, of additional means for supplying fluid under pressure through the side of the mixing chamber at the other end thereof, and a conveyer tube insertible in the chamber and rotatable therein, having a central passage which leads from the mixing chamber and terminates in a plurality of apertures arranged in a circle, and with a concentric passage which is communicative with the means for supplying fluid under pressure at the side of the chamber, and for conducting the fluid received therefrom to the end of the tube where the passage terminates in a single aperture at the center of said circle of apertures.

7. In a torch of the class described, a rotatable conveyer tube having a central passage and a concentric outer passage, of means for supplying combustible mixture to the central passage, and for separately supplying a fluid under pressure to the outer passage, and means at the end of the conveyer tube including a nozzle member which extends over and is attached to the end of the tube for forming a plurality of apertures arranged in a circle and connected with the central passage of the tube, and also forming a central bore at the end of the nozzle member which is connected with the outer concentric passage of the tube by means of perforations in the end of the tube which is covered by the said nozzle member.

8. In a cutting torch, the combination of a handle member, a set of three valves grouped at the rear end of said handle member, one of said valves for controlling a supply of acetylene or analogous gas, and the other two valves for controlling supplies of oxygen or analogous gas, a mixer chamber contained within the handle element, mixing means interposed between said chamber and said valves, conduits connecting said mixing means with the acetylene valve and one of said oxygen valves, a conveyer tube secured to the front end of said handle and provided with a pair of internal conduits, one of said conduits communicating with said chamber, means for conducting a supply of oxygen from the other oxygen valve to the other conduit, and a nozzle on the end of said tube provided with orifices communicating, respectively and independently, with said conduits.

9. In a torch of the class described, the combination of a cylindrical shell, a housing at the rear end of said shell and provided with a single acetylene valve and a pair of oxygen valves, a mixer chamber in the front end of said shell, mixer means interposed between the rear end of said chamber and said valve housing, a pair of pipes contained within said shell for connecting said mixer means, respectively, with the oxygen and acetylene supplies through the acetylene and one of the oxygen valves, a third pipe also contained within said shell and leading to the front end thereof, a conveyer pipe provided with an inner pipe, the mouths of said pipes being united together at their extremities, said conveyer tube being secured to the front end of said shell, with the inner tube thereof communicating with said mixer chamber, the outer tube communicating with the third oxygen pipe, and a tip for said conveyer element provided with orifices communicating independently, respectively, with the tubes of said conveyer.

10. In a torch of the class described, the combination of a cylindrical shell, a housing at the rear end of said shell and provided with a single acetylene valve and a pair of oxygen valves, a mixer chamber in the front end of said shell, mixer means interposed between the rear end of said chamber and said valve housing, a pair of pipes contained within said shell for connecting said mixer means, respectively, with the oxygen and acetylene supplies through the acetylene and one of the oxygen valves, a third pipe also contained within said shell and leading to the front end thereof, a conveyer pipe provided with an inner pipe, the mouths of said pipes being united together at their extremities, said conveyer tube being secured to the front end of said shell, with the inner tube thereof communicating with said mixer chamber, the outer tube communicating with the third oxygen pipe, and a tip for said conveyer element provided with orifices communicating independently, respectively, with the tubes of said conveyer, said conveyer tube being rotatably adjustable while maintaining said communications between the tubes thereof and the oxygen pipe and mixing chamber.

CLARENCE H. BURRITT.

Copies of this patent may be obtained for five cents each, by addressing the "Commissioner of Patents, Washington, D. C."